United States Patent
Smith et al.

(10) Patent No.: US 9,551,393 B2
(45) Date of Patent: Jan. 24, 2017

(54) ROTORCRAFT VIBRATION ISOLATION SYSTEMS

(71) Applicant: Bell Helicopter Textron Inc., Fort Worth, TX (US)

(72) Inventors: Michael Smith, Colleyville, TX (US); Frank Bradley Stamps, Colleyville, TX (US); Taeoh Lee, Keller, TX (US); David E. Heverly, II, Arlington, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 212 days.

(21) Appl. No.: 14/259,757

(22) Filed: Apr. 23, 2014

(65) Prior Publication Data
US 2015/0308534 A1    Oct. 29, 2015

(51) Int. Cl.
*B64C 27/00*    (2006.01)
*F16F 7/10*    (2006.01)

(52) U.S. Cl.
CPC .......... *F16F 7/1034* (2013.01); *B64C 27/001* (2013.01); *B64C 2027/002* (2013.01)

(58) Field of Classification Search
CPC .. B64C 27/001; B64C 2027/002; F16F 7/1034
See application file for complete search history.

(56) References Cited

U.S. PATENT DOCUMENTS

| | | | |
|---|---|---|---|
| 3,690,607 A * | 9/1972 | Mard | B64C 27/001 188/382 |
| 4,236,607 A | 12/1980 | Halwes et al. | |
| 4,733,854 A | 3/1988 | Miyamoto | |
| 4,742,998 A * | 5/1988 | Schubert | B64C 27/001 137/807 |
| 4,784,378 A * | 11/1988 | Ford | F16F 13/08 267/140.11 |
| 5,018,698 A | 5/1991 | Tobias | |
| 5,050,835 A * | 9/1991 | Tobias | B64C 27/001 248/550 |

(Continued)

FOREIGN PATENT DOCUMENTS

| | | |
|---|---|---|
| CA | 2186453 | 5/2005 |
| WO | 2006/124112 | 11/2006 |
| WO | 2013/011264 | 1/2013 |

OTHER PUBLICATIONS

Halwes, D. R. "Total Main Rotor Isolation System Analysis." NASA Contractor Report 165667. Jun. 1981. 144 pages.*

(Continued)

*Primary Examiner* — Philip J Bonzell
*Assistant Examiner* — Michael Kreiner

(57) ABSTRACT

A rotorcraft vibration isolation system includes a plurality of liquid inertia vibration elimination (LIVE) units mounted on a first rotorcraft surface, an accumulator mounted on a second rotorcraft surface at a location that is remote from locations of the plurality of LIVE units, and a fluid passage to connect the accumulator to the plurality of LIVE units in parallel. The fluid passage has sufficient length to traverse between the location of the accumulator and each location of each LIVE unit. During rotorcraft operation, the second rotorcraft surface experiences lesser periodic vibration than the first rotorcraft surface.

16 Claims, 6 Drawing Sheets

(56) References Cited

U.S. PATENT DOCUMENTS

| | | | | |
|---|---|---|---|---|
| 5,062,498 A * | 11/1991 | Tobias | ................... | B60K 6/12 180/308 |
| 5,067,684 A | 11/1991 | Garnjost | | |
| 5,101,929 A * | 4/1992 | Tobias | ................... | B60G 13/14 180/300 |
| 5,141,202 A | 8/1992 | Tobias | | |
| 5,168,703 A * | 12/1992 | Tobias | ................... | B60K 5/12 180/306 |
| 5,310,017 A * | 5/1994 | Tobias | ................... | B60G 13/14 180/291 |
| 5,332,203 A | 7/1994 | Gossman et al. | | |
| 5,413,320 A | 5/1995 | Herbst | | |
| 5,423,523 A | 6/1995 | Gossman et al. | | |
| 5,435,531 A | 7/1995 | Smith et al. | | |
| 5,439,082 A | 8/1995 | McKeown | | |
| 5,704,596 A | 1/1998 | Smith et al. | | |
| 5,788,372 A | 8/1998 | Jones et al. | | |
| 6,009,983 A | 1/2000 | Stamps et al. | | |
| 6,022,600 A | 2/2000 | Schmidt et al. | | |
| 6,032,936 A | 3/2000 | Redinger | | |
| 6,092,795 A | 7/2000 | McGuire | | |
| 6,131,709 A * | 10/2000 | Jolly | ................... | F16F 9/20 137/909 |
| 6,217,011 B1 | 4/2001 | Redinger | | |
| 6,293,532 B2 | 9/2001 | McGuire | | |
| 6,416,016 B1 * | 7/2002 | Welsh | ................... | B64C 27/001 188/378 |
| 6,431,530 B1 * | 8/2002 | Stamps | ................... | F16F 1/38 267/136 |
| 6,695,106 B2 | 2/2004 | Smith et al. | | |
| 7,308,976 B2 * | 12/2007 | Turner | ................... | B60G 17/0424 188/282.8 |
| 7,490,792 B1 * | 2/2009 | Carter, Jr. | ................... | B64C 27/001 244/17.27 |
| 8,113,321 B2 | 2/2012 | McGuire et al. | | |
| 8,328,129 B2 * | 12/2012 | Smith | ................... | B64C 27/12 244/17.11 |
| 8,499,907 B2 * | 8/2013 | Smith | ................... | B64C 27/001 188/316 |
| 8,602,400 B2 | 12/2013 | Ward et al. | | |
| 8,684,340 B2 * | 4/2014 | Smith | ................... | B64C 27/001 248/566 |
| 8,840,062 B2 * | 9/2014 | Smith | ................... | F16F 13/24 244/54 |
| 9,297,439 B2 * | 3/2016 | Smith | ................... | B64C 27/001 |
| 2002/0060268 A1 * | 5/2002 | Smith | ................... | B64C 27/001 244/54 |
| 2006/0151272 A1 | 7/2006 | Smith et al. | | |
| 2006/0261530 A1 * | 11/2006 | Stamps | ................... | F16F 13/24 267/140.11 |
| 2009/0289472 A1 | 11/2009 | Catanzarite et al. | | |
| 2010/0301160 A1 | 12/2010 | Ward et al. | | |
| 2011/0259687 A1 * | 10/2011 | Smith | ................... | B64C 27/001 188/319.2 |
| 2013/0175389 A1 | 7/2013 | Griffin | | |

OTHER PUBLICATIONS

Dr. Rainer Kamps, TC Tungsten Compounds, Sodium metatungstate/Sodium polytungstate, 12 pages.
LST Fastfloat brochure, info@polytungstate.co.uk, 2 pages.

* cited by examiner

ROTORCRAFT VIBRATION ISOLATION SYSTEMS

TECHNICAL FIELD

This disclosure relates to mechanical vibrations in moving bodies.

BACKGROUND

Different rotorcraft surfaces experience different levels of vibration. For example, a transmission of a rotorcraft experiences periodic vibration due to the rotation of the rotor, while a fuselage of the rotorcraft experiences relatively lesser vibration. A vibration isolation system is used in rotorcrafts such as helicopters and tiltrotors to dampen or isolate vibrations between two surfaces of the rotorcraft. For example, a vibration isolation system dampens or isolates periodic vibration of the transmission. A vibration isolation system sometimes includes an isolator on the rotorcraft transmission and an accumulator attached to the isolator. An isolator, for example, a liquid inertia vibration elimination (LIVE) unit, reduces or cancels transmissibility of vibration from one surface of a rotorcraft to another surface of the rotorcraft.

SUMMARY

This specification describes rotorcraft vibration isolation systems in which multiple isolators are connected to a remotely positioned accumulator.

Certain aspects encompass, a rotorcraft vibration isolation system including a plurality of liquid inertia vibration elimination (LIVE) units mounted on a first rotorcraft surface, an accumulator mounted on a second rotorcraft surface at a location that is remote from locations of the plurality of LIVE units, and a fluid passage to connect the accumulator to the plurality of LIVE units in parallel. The fluid passage has sufficient length to traverse between the location of the accumulator and each location of each LIVE unit. During rotorcraft operation, the second rotorcraft surface experiences lesser periodic vibration than the first rotorcraft surface.

Certain aspects encompass, a rotorcraft including a first rotorcraft surface, a second rotorcraft surface which, during rotorcraft operation, experiences lesser periodic vibration than the first rotorcraft surface, and a rotorcraft vibration isolation system. The rotorcraft vibration isolation system includes one or more liquid inertia vibration elimination (LIVE) units mounted on the first rotorcraft surface, an accumulator mounted on the second rotorcraft surface at a location that is remote from locations of the one or more LIVE units, and a fluid passage to connect the accumulator to the one or more LIVE units in parallel. The fluid passage has sufficient length to traverse between the location of the accumulator and each location of each LIVE unit.

Certain aspects encompass a method for isolating periodic vibration in a system. The method includes mounting a plurality of liquid inertia vibration elimination (LIVE) units on a first surface of a system, mounting an accumulator on a second surface of the system at a location that is remote from locations of the plurality of LIVE units, and connecting the accumulator and the plurality of LIVE units in parallel using a fluid passage having sufficient length to traverse between the location of the accumulator and each location of each LIVE unit. During operation of the system, the second surface experiences lesser periodic vibration than the first surface.

The aspects above can include some, none, or all of the following features. The accumulator is configured to provide positive pressure to the plurality of LIVE units throughout a range of rotorcraft operating temperatures. The fluid passage includes a plurality of tubing sections, with each tubing section connecting the accumulator and a respective LIVE unit. The fluid passage includes either flexible or hard tubing. Each tubing section includes a respective valve. The valve is a pressure sensitive valve or a unidirectional valve. The valve is positioned nearer to the LIVE unit than the accumulator in the tubing section. A distance between the location of the accumulator and the locations of the plurality of LIVE units is at least six inches. The first rotorcraft surface includes a rotorcraft transmission and the second rotorcraft surface includes a rotorcraft fuselage. Each LIVE unit includes tuned fluid mass to generate pressure oscillation, and wherein the accumulator is a passive accumulator configured to compensate the pressure oscillation in each LIVE unit. Each tubing section includes a valve positioned immediately adjacent the LIVE unit. The method includes providing positive pressure to the plurality of LIVE units using the accumulator throughout a range of operating temperatures of the system. The system is a rotorcraft, and the first surface includes a rotorcraft transmission and the second rotorcraft surface includes a rotorcraft fuselage. A distance between the location of the accumulator and the locations of the one or more LIVE units is at least six inches.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
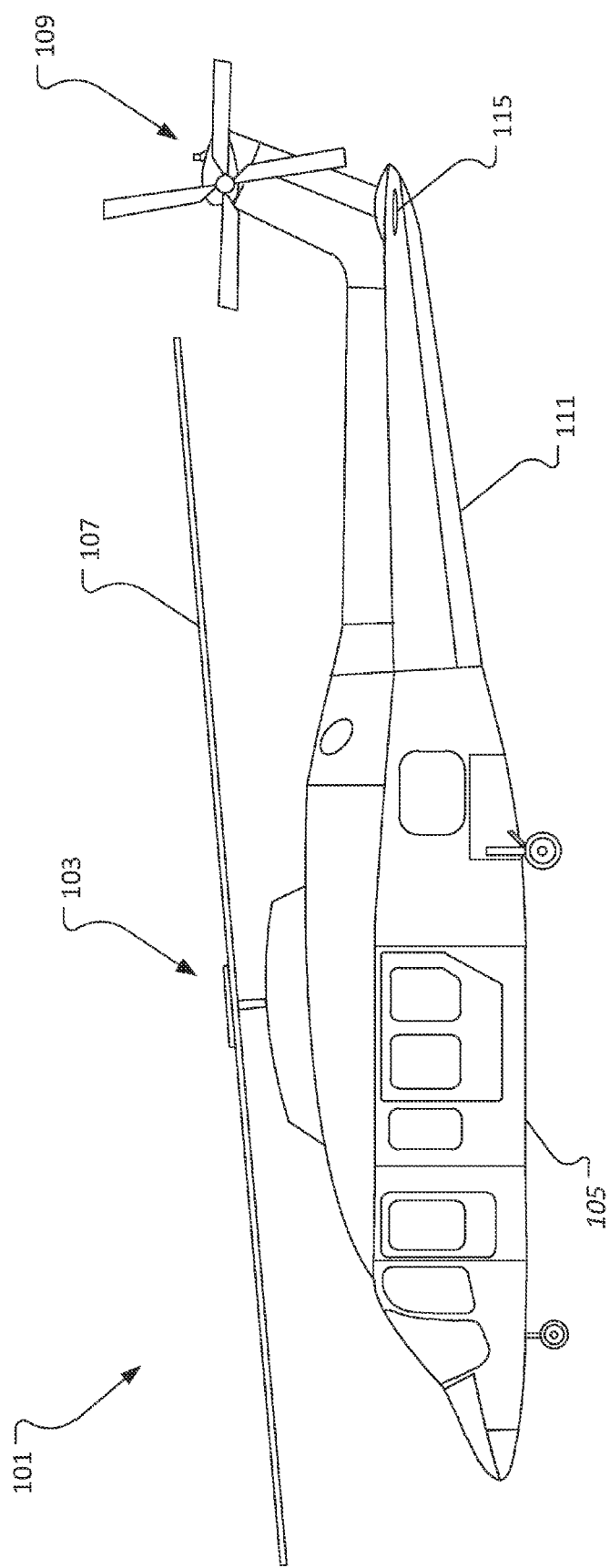
FIG. 1 is a schematic side view of an example helicopter.

This disclosure describes a rotorcraft vibration isolation system that dampens and/or isolates vibrations between two surfaces of a rotorcraft. Some rotorcraft surfaces experience less vibration relative to other rotorcraft surfaces. Rotorcraft vibration isolation systems allow isolation of certain vibrations from reaching the relatively lesser vibrating surfaces. FIG. 1 shows an example helicopter 101 that can implement a rotorcraft isolation system on two or more surfaces of the helicopter 101. Similarly, FIG. 2 shows an example tiltrotor aircraft 201 that can implement a rotorcraft vibration isolation system on two or more surfaces of the tiltrotor aircraft 201.

A rotorcraft vibration isolation system includes one or more LIVE units mounted on a first rotorcraft surface and an accumulator mounted on a second rotorcraft surface which experiences lesser periodic vibration than the first rotorcraft surface during rotorcraft operation. The rotorcraft vibration isolation system can be implemented on (e.g., mounted to) any two surfaces between which periodic vibrations are desired to be dampened or cancelled. For example, the rotorcraft vibration isolation system can be implemented between a rotor transmission and a fuselage, between a rotorcraft engine and a fuselage, between a rotorcraft airframe roof assembly and a rotor transmission, between a fuselage and rotorcraft seats, between a sight scope and a rotorcraft mounting surface, and/or between other rotorcraft components. A rotorcraft vibration isolation system dampens and/or cancels specific vibration frequencies or vibrations with specific characteristics, for example, periodic vibrations and harmonic vibrations. Sometimes, the accumulator can be directly mounted to the LIVE unit. In some implementations, such as those described below, the accumulator is mounted on the rotorcraft remotely from the LIVE unit.

Figure 2:
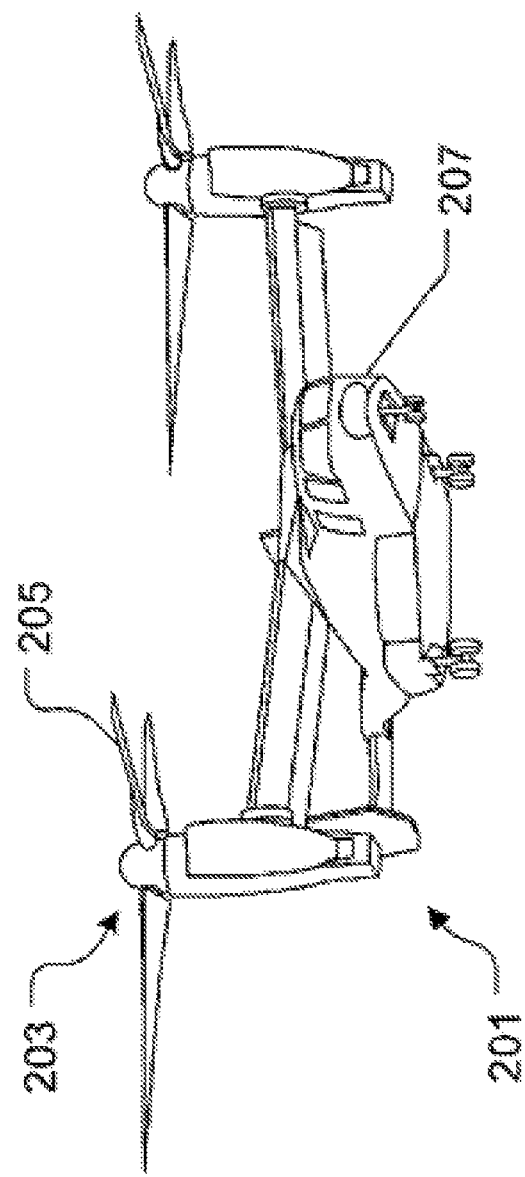
FIG. 2 is a schematic view of an example tiltrotor aircraft.

FIGS. 1 and 2 are schematic diagrams of two different rotary aircrafts. FIG. 1 is a side view of the example helicopter 101, while FIG. 2 is an oblique view of the example tiltrotor aircraft 201. Helicopter 101 includes a rotary system 103 carried by a fuselage 105. Rotor blades 107 connected to the rotary system 103 provide flight for helicopter 101. The rotor blades 107 are controlled by multiple controllers within fuselage 105. The pitch of each rotor blade 107 can be manipulated to selectively control direction, thrust, and lift of the helicopter 101. For example, during flight a pilot can manipulate a cyclic controller for changing the pitch angle of rotor blades 107 and/or manipulate pedals, thus providing vertical, horizontal, and yaw flight movement. Helicopter 101 can further include an anti-torque system 109 and empennages 111 and 115.

Tiltrotor aircraft 201 includes two or more rotary systems 203 having multiple proprotors 205 and carried by rotatable nacelles. The rotatable nacelles allow aircraft 201 to take-off and land like a conventional helicopter, and for horizontal flight like a conventional fixed wing aircraft. Like the helicopter 101, the tiltrotor aircraft 201 includes controls, e.g., cyclic controllers and pedals, carried within the cockpit of fuselage 207, for causing movement of the aircraft.

Figure 3:
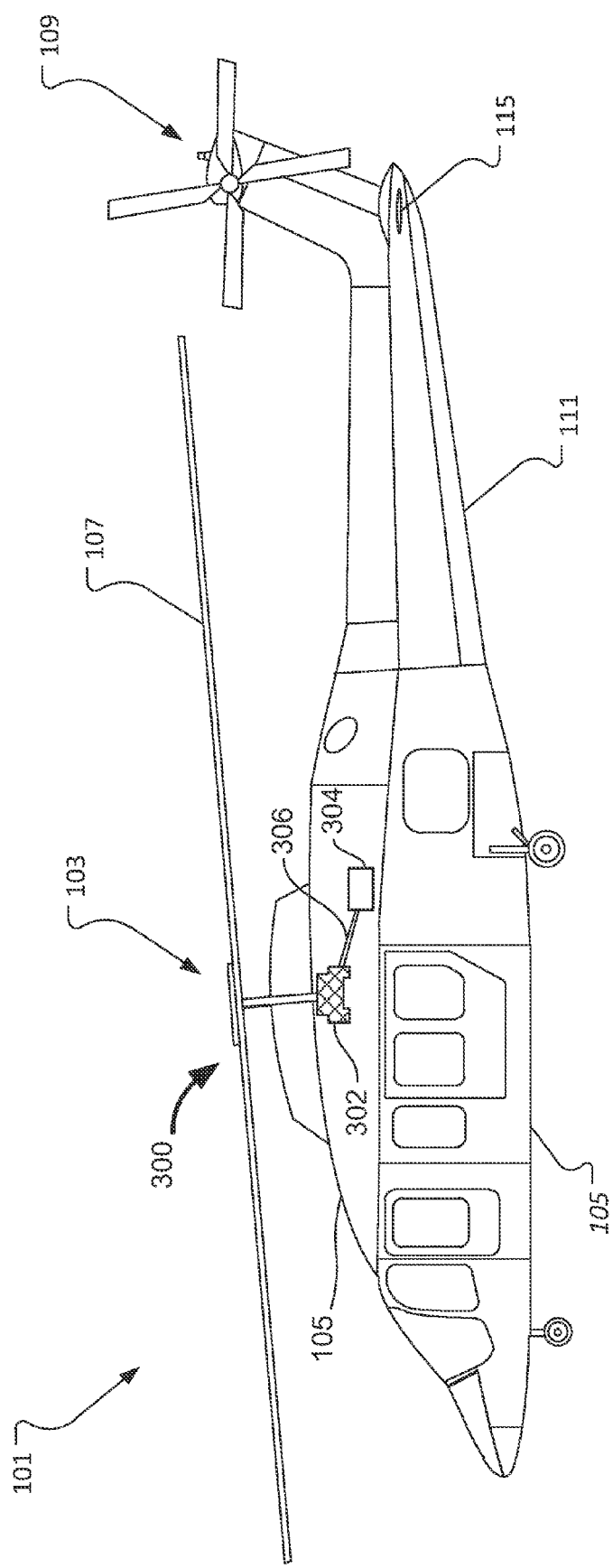
FIG. 3 is a schematic view of an example rotorcraft with an example vibration isolation system.

FIG. 3 shows a schematic diagram of an example vibration isolation system 300 on the example helicopter 101 of FIG. 1. The vibration isolation system can be mounted on a surface of the helicopter 101 that experiences periodic vibration, e.g., the transmission. The example vibration isolation system 300 includes multiple LIVE units 302 on the transmission of the helicopter 101, an accumulator 304 on the fuselage 105 of the helicopter 101 and remote from the LIVE units 302, and a fluid passage 306 connecting the accumulator 304 to each of the LIVE units 302 in parallel. In some implementations, one or more or each LIVE unit 302 is mounted to a different periodically vibrating surface. Each LIVE unit 302 is connected to the same accumulator 304. In some implementations, one or more or each LIVE unit is connected to its own accumulator. The fluid passage 306 has sufficient length to traverse between the location of the accumulator 304 and each location of each LIVE unit 302. The LIVE units 302 isolate periodic vibration of the transmission from transmitting to the fuselage 105 via a fluid balance in the LIVE units 302 and in the fluid passage 306 between the LIVE units 302 and the accumulator 304. For example, the LIVE units 302 use inertia of a fluid in the LIVE unit 302 to tune an isolation frequency of the periodic vibration, thus reducing transmissibility of the periodic vibration from the transmission to the fuselage 105. In this example, the fluid acts as a tuning mass. In some implementations, the LIVE units 302 are mounted to a different surface of the helicopter 101 than the transmission, and/or the accumulator 304 is mounted to a different surface of the helicopter 101 than the fuselage 105. In general, the accumulator 304 is mounted to a surface that does not experience the periodic vibrations experienced by the surface (or surfaces) to which the LIVE units 304 are mounted.

Figure 4:
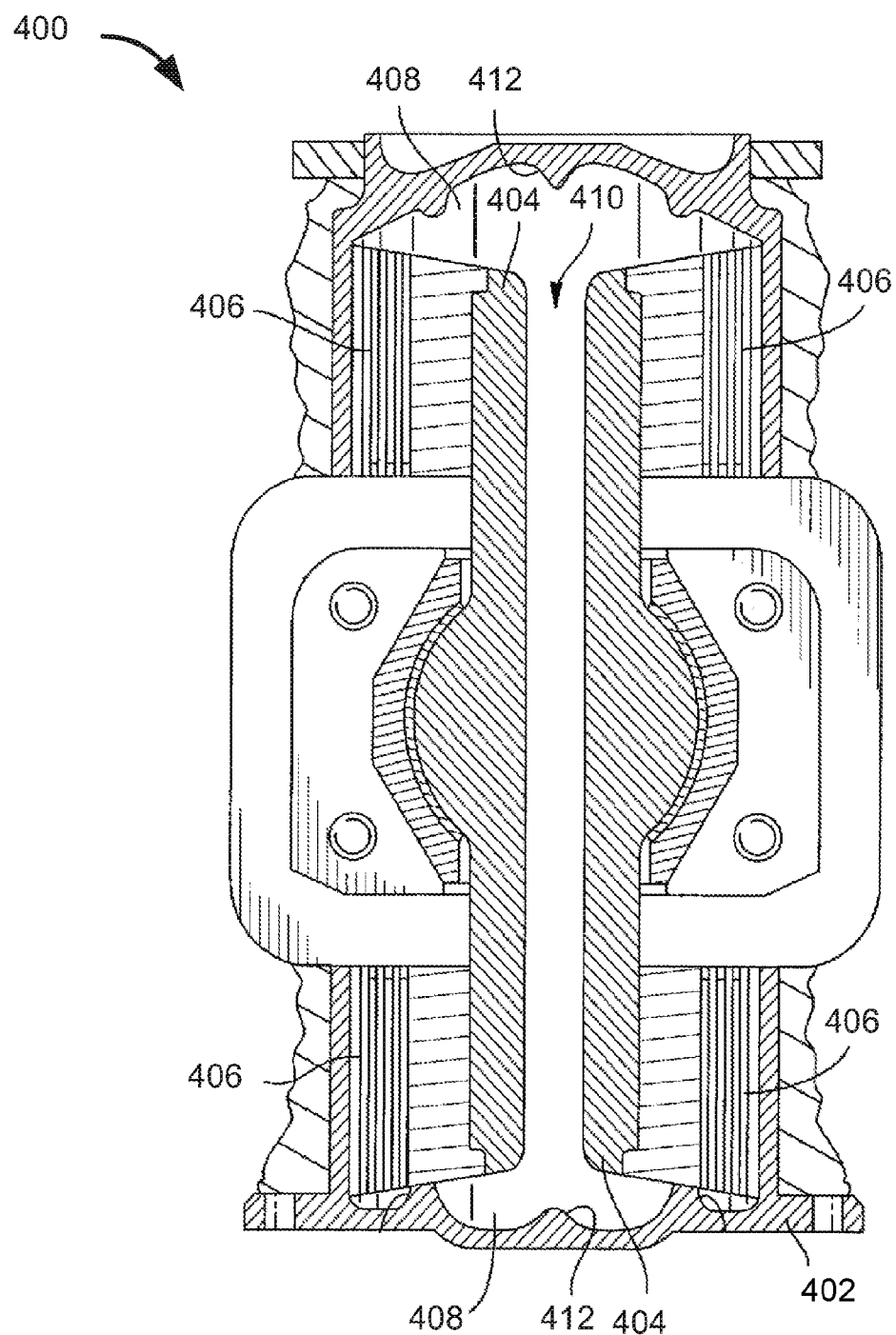
FIG. 4 is a schematic side cross-sectional view of an example LIVE unit.

LIVE units are vibration-cancelling throughput components, and can take many forms. Referring to FIG. 4, an example LIVE unit 400 that can be used in the example vibration isolation system 300 of FIG. 3 is shown in partial cross-sectional view. The example LIVE unit 400 includes a housing 402 that has a hollow, generally cylindrical interior. A piston 404 of selected cross-sectional diameter is disposed within the interior of the housing 402. An elastomeric seal and spring member 406 resiliently seals the piston 404 within the interior of the housing 402. A fluid chamber 408 is defined by the interior of the housing 402 and the piston 404 and is sealed against leakage by the elastomeric seal and spring member 406. Tuning fluid (e.g., high-density, low-viscosity fluid) is disposed within fluid chamber 408. In addition to sealing the tuning fluid in fluid chamber 408, the elastomeric seal and spring member 406 functions as a spring to permit the piston 404 to move or oscillate relative to the housing 402, while maintaining the piston 404 in a central location in the housing 402 when no load is applied.

A tuning port or passage 410 extends centrally through the piston 404 and permits the tuning fluid to move from one end of fluid chamber 408 to the other. In some implementations, a conical flow diverter 412 is provided at each end of the housing 302 and is aligned with and generally opposes an opening at each end of the tuning passage 410. Each conical flow diverter 412 enhances fluid flow by decelerating the tuning fluid as it flows from each end of the fluid chamber 408 into and out of the passage 410.

Figure 5:
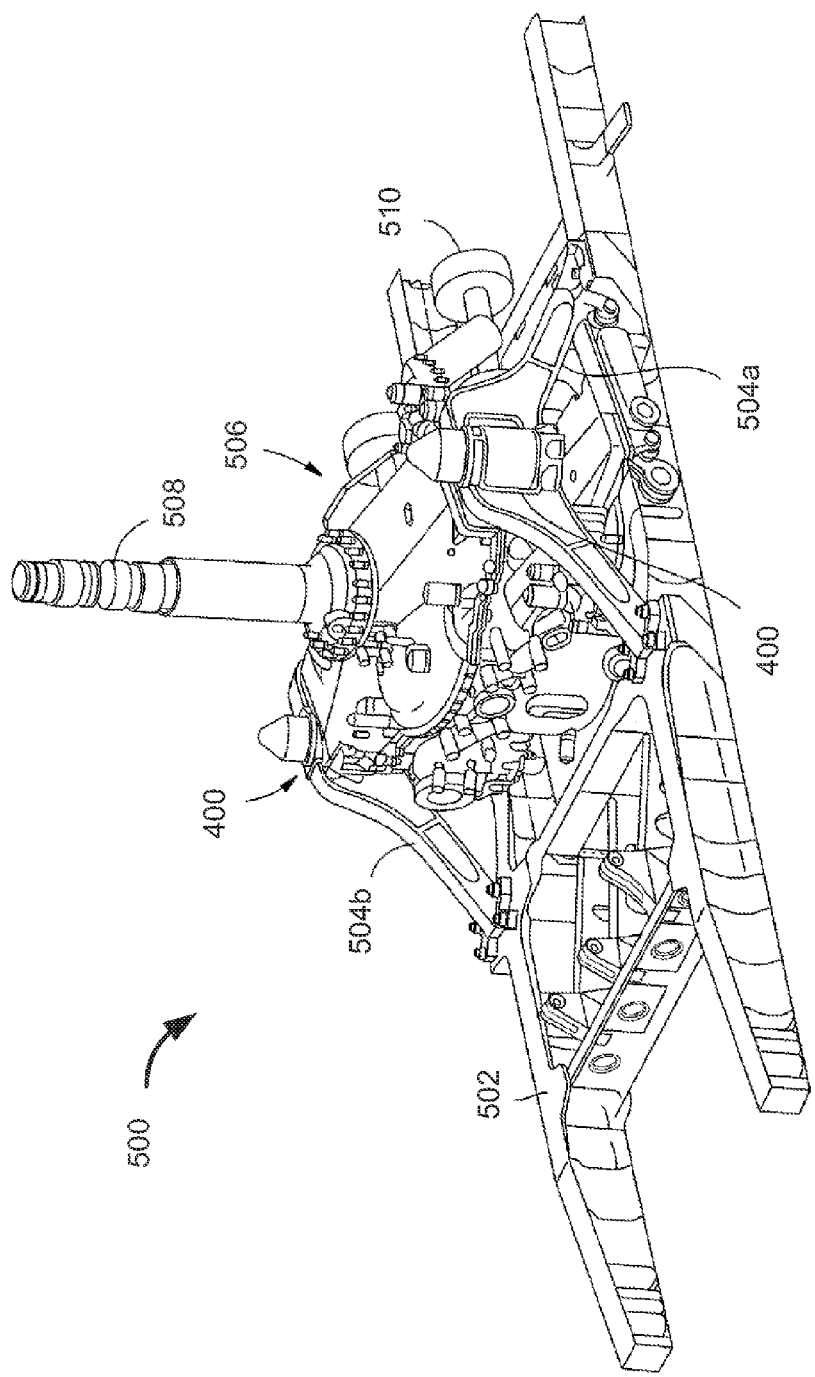
FIG. 5 is a perspective view of an example airframe roof beam and pylon assembly.

FIG. 5 shows a perspective view of an example airframe roof beam and pylon assembly 500 that can be implemented on a rotorcraft, such as the helicopter 101 of FIG. 3 and the tiltrotor aircraft 201 of FIG. 2. The assembly 500 includes a partial airframe roof beam 502 and pylon support beams 504a and 504b mounted to the airframe 502 for supporting the pylon. The pylon generally refers to the propulsion system, which includes a rotor assembly (not shown) and a transmission 506. A main rotor shaft 508, on which a main rotor assembly (not shown) can be mounted, extends upwardly from the transmission 506. The transmission 506 can be driven by an engine (not shown) via a shaft 510 to turn the main rotor shaft 508. The resulting vibrations are isolated from the airframe 502 by LIVE units 400.

Referring back to FIG. 3, the accumulator 304 holds the fluid in the vibration isolation system 300 within a certain pressure range to compensate for pressure oscillations in the fluid. The accumulator 304 is configured to provide positive pressure to the LIVE units 302 throughout a range of rotorcraft operating temperatures, for example, between −40° F. and 140° F. In certain instances, the rotorcraft operating temperature is greater than 140° F. or less than −40° F. In some implementations, each LIVE unit 302 includes tuned fluid mass (e.g., tuning fluid) to generate pressure oscillation, and the accumulator 304 is a passive accumulator configured to compensate the pressure oscillation in each LIVE unit 302 and static pressure change due to an ambient environment. The fluid passages 306 include multiple tubing sections of flexible tubing, and each tubing section connects the accumulator 304 and a respective LIVE unit 302. For example, the tubing section can connect to a fluid chamber of the respective LIVE unit 302. In some implementations, the tubing sections include hard tubing, or a combination of hard and flexible tubing.

The tubing sections of the fluid passages 306 can include additional or different features. In some implementations, each tubing section includes a valve in the fluid passage 306 between the LIVE unit 302 and the accumulator 304. For example, the valve can be a pressure sensitive valve, a unidirectional valve, a check valve, or another type of valve adapted to maintain a specific pressure range in the respective tubing section. In certain implementations, the valve maintains pressure in one part of the tubing section if another part of the tubing section was to leak, rupture, or otherwise lose pressure. In other implementations, the tubing section excludes a valve in the fluid passage 306, for example, when the accumulator 304 is above the LIVE units 302 and utilizes a gravity feed to maintain fluid pressure in the LIVE units.

The valves can facilitate the control of fluid flow in the fluid passages 306. In some implementations, one or more or each valve (or other appropriate device) can choke fluid flow between each respective LIVE unit 302 and the accumulator 304. The valve can act as a choke, or a choke can be implemented in the tubing section in addition to the valve. The choke is adapted to allow static pressure to move between the respective LIVE unit 302 and the accumulator 304, or between two LIVE units 302. The choke is also adapted to disallow oscillatory pressure to move between the respective LIVE unit 302 and the accumulator 304, and/or between two LIVE units 302. The choke can be aligned or restricted to segregate the static pressure and oscillatory pressure such that oscillatory pressure is restricted (substantially or wholly) at the choke and the accumulator experiences static pressure. Each valve and/or choke can be positioned nearer to the respective LIVE unit 302 in the tubing section than to the accumulator 304, for example, such that volumetric stiffness of the fluid in the respective LIVE unit 302 is minimally affected by an elastic nature of the respective tubing section. In other words, the pressure of fluid in the LIVE unit 302 is minimally affected by potential flexing or bulging of the respective tubing section, for example, in soft tubing. In certain implementations, each valve is positioned immediately adjacent to its respective LIVE unit 302, for example, so that there is little to no pressure drop in the LIVE unit.

In instances when the accumulator 304 mounts directly to the LIVE unit 302, a direct fluid pathway exists between the accumulator 304 and the LIVE unit 302 that fluidly connects the LIVE unit 302 and the accumulator 304. The direct fluid pathway compensates for pressure oscillation in the fluid. In other instances when the accumulator 304 mounts remotely from the LIVE unit(s) 302, the fluid pathway 306 fluidly connects the LIVE units 302 and the accumulator 304, compensates for pressure oscillation in the fluid, and can attenuate pressure oscillation in the fluid between the LIVE units 302 and the accumulator 304. The accumulator 304 is sufficiently remote from the LIVE units 302 such that the accumulator 304 experiences lesser periodic vibrations on the second surface than the periodic vibrations that the LIVE units 302 experience on the first surface. A distance between the location of the accumulator 304 and the locations of the LIVE units 302 can be at least 6 inches. In some implementations, the tubing sections of the fluid pathways 306 follow a straight pathway from each respective LIVE unit 302 to the accumulator 304. In other implementations, one or more tubing sections follow a more tortuous pathway from one or more respective LIVE units 302 to the accumulator 304. For example, the tubing sections can travel around, between, through, or otherwise beyond obstacles between respective LIVE units 302 and the accumulator 304. The tubing sections of the fluid pathways 306 attenuate vibration between each respective LIVE unit 302 and the accumulator 304. In some implementations, a more tortuous path of the tubing section correlates to a greater attenuation of (e.g., decrease in) oscillation transmission between the respective LIVE unit 302 and the accumulator 304 than a more direct and straight path of the tubing section.

Although FIG. 3 depicts the example vibration isolation system 300 on the example helicopter 101, the example vibration isolation system 300 can be implemented on other rotorcrafts, such as the tiltrotor aircraft 201 of FIG. 2.

In some implementations, a rotorcraft vibration isolation system with an accumulator remote from multiple LIVE units allows for flexibility in size and placement of the accumulator, and flexibility in size, placement, and number of LIVE units on a rotorcraft. A remote accumulator provides to a user the ability to readily observe and monitor fluid levels and pressure in the accumulator. The ability to place the accumulator remotely from the LIVE units allows for more efficient use of limited space on a rotorcraft. A fluid pathway with a tubing section between the accumulator and the LIVE units allows inherent attenuation of fluid pressure oscillation through the fluid pathway.

Figure 6:
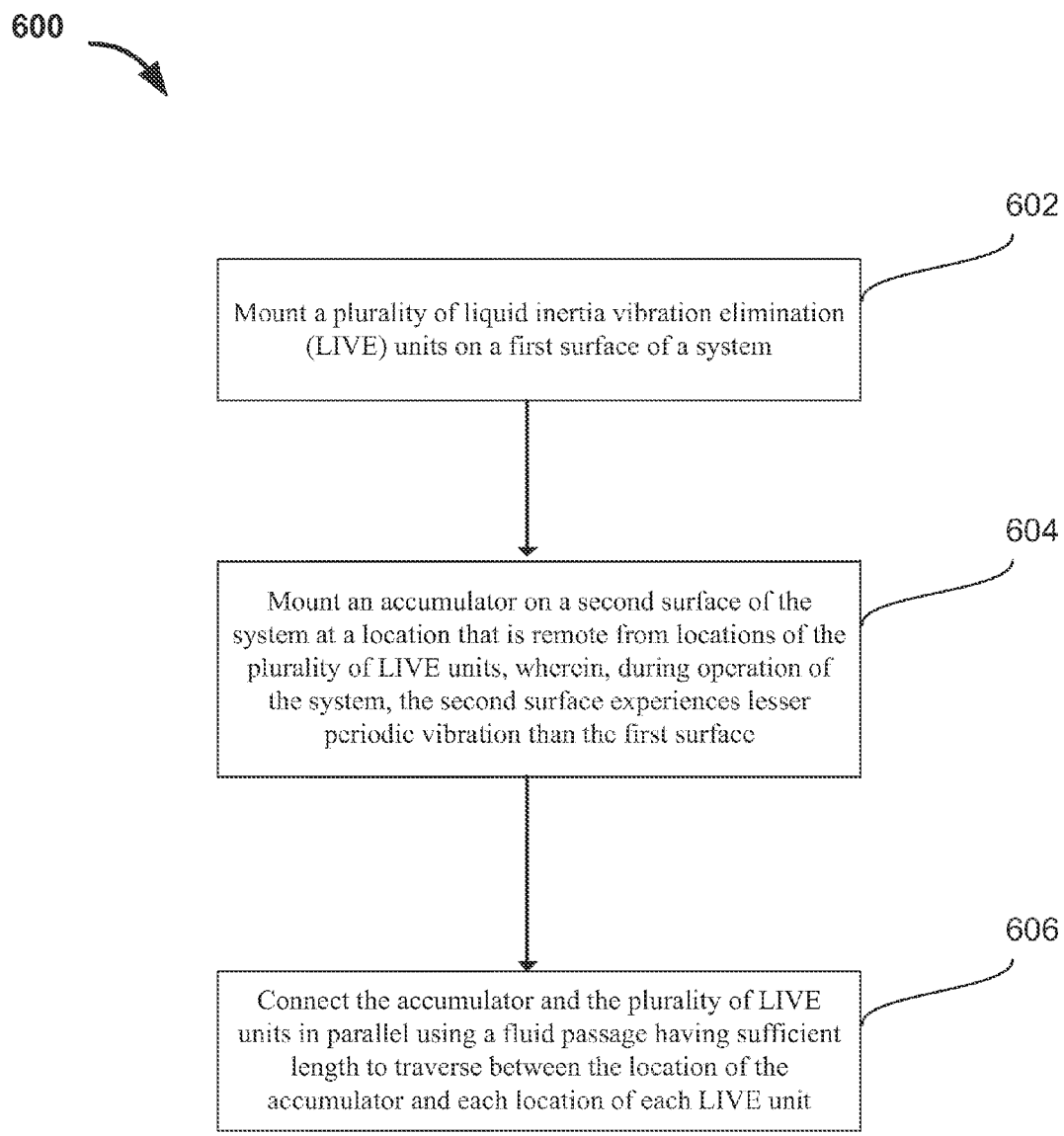
FIG. 6 is a flowchart describing a method for isolating periodic vibration in a periodically vibrating system.

FIG. 6 is a flow chart describing a method 600 for isolating periodic vibration in a periodically vibrating system, for example, performed by the example vibration isolation system 300. At 602, one or more LIVE units are mounted on a first surface of a periodically vibrating system. At 604, an accumulator is mounted on a second surface of the periodically vibrating system at a location that is remote from locations of the LIVE units. During operation of the periodically vibrating system, the second surface experiences lesser periodic vibration than the first surface. At 606, the accumulator is connected to the LIVE units in parallel using a fluid passage having sufficient length to traverse between the location of the accumulator and each location of each LIVE unit. In some implementations, the periodically vibrating system is a rotorcraft, the first surface includes a rotorcraft transmission, and the second surface includes a rotorcraft fuselage. In certain instances, a distance between the location of the accumulator and the locations of the LIVE units is at least six inches.

A number of implementations have been described. Nevertheless, it will be understood that various modifications may be made without departing from the spirit and scope of the disclosure.

What is claimed is:
1. A rotorcraft vibration isolation system comprising:
   a plurality of liquid inertia vibration elimination (LIVE) units mounted on a first rotorcraft surface;
   each LIVE unit comprising a housing defining a fluid chamber, a fluid disposed within the fluid chamber, a piston disposed within the housing that divides the fluid chamber into two volumes, and a tuning port or passage passing through the piston such that the two volumes are in fluid communication;
   a passive accumulator mounted on a second rotorcraft surface at a location that is remote from locations of the plurality of LIVE units, wherein, during rotorcraft operation, the second rotorcraft surface experiences lesser periodic vibration than the first rotorcraft surface; and a fluid passage to connect the passive accumulator to the fluid chamber of the plurality of LIVE units in parallel, the fluid passage having sufficient length to traverse between the location of the passive accumulator and each location of each LIVE unit.

2. The system of claim 1, wherein the passive accumulator is configured to provide positive pressure to the plurality of LIVE units throughout a range of rotorcraft operating temperatures.

3. The system of claim 1, wherein the fluid passage includes a plurality of tubing sections, each tubing section connecting the passive accumulator and a respective LIVE unit and wherein the fluid passage includes either flexible or hard tubing.

4. The system of claim 3, wherein each tubing section includes a respective valve.

5. The system of claim 4, wherein the valve is a pressure sensitive valve or a unidirectional valve, and wherein the valve is positioned nearer to the LIVE unit than the passive accumulator in the tubing section.

6. The system of claim 1, wherein a distance between the location of the passive accumulator and the locations of the plurality of LIVE units is at least six inches.

7. The system of claim 1, wherein the first rotorcraft surface includes a rotorcraft transmission and the second rotorcraft surface includes a rotorcraft fuselage.

8. The system of claim 1, wherein each LIVE unit includes tuned fluid mass to generate pressure oscillation, and wherein the passive accumulator is configured to compensate the pressure oscillation in each LIVE unit.

9. A rotorcraft comprising:
a first rotorcraft surface;
a second rotorcraft surface which, during rotorcraft operation, experiences lesser periodic vibration than the first rotorcraft surface; and
a rotorcraft vibration isolation system comprising:
one or more liquid inertia vibration elimination (LIVE) units mounted on the first rotorcraft surface;
each LIVE unit comprising a housing defining a fluid chamber, a fluid disposed within the fluid chamber, a piston disposed within the housing that divides the fluid chamber into two volumes, and a tuning port or passage passing through the piston such that the two volumes are in fluid communication;
a passive accumulator mounted on the second rotorcraft surface at a location that is remote from locations of the one or more LIVE units; and
a fluid passage to connect the passive accumulator to the fluid chamber of the one or more LIVE units in parallel, the fluid passage having sufficient length to traverse between the location of the passive accumulator and each location of each LIVE unit.

10. The rotorcraft of claim 9, wherein the passive accumulator is configured to provide positive pressure to the one or more LIVE units throughout a range of rotorcraft operating temperatures.

11. The rotorcraft of claim 9, wherein the fluid passage includes either flexible or hard tubing.

12. The rotorcraft of claim 11, wherein the fluid passage includes a plurality of tubing sections, each tubing section connecting the passive accumulator and a respective LIVE unit and wherein the fluid passage includes either flexible or hard tubing.

13. The rotorcraft of claim 12, wherein each tubing section includes a valve positioned immediately adjacent the LIVE unit.

14. The rotorcraft of claim 9, wherein a distance between the location of the passive accumulator and the locations of the one or more LIVE units is at least six inches.

15. The rotorcraft of claim 9, wherein the first rotorcraft surface includes a rotorcraft transmission and the second rotorcraft surface includes a rotorcraft fuselage.

16. The rotorcraft of claim 9, wherein each LIVE unit includes tuned fluid mass to generate pressure oscillation, and wherein the passive accumulator is configured to compensate the pressure oscillation in each LIVE unit.

* * * * *